United States Patent
Lange

(10) Patent No.: US 6,676,217 B2
(45) Date of Patent: Jan. 13, 2004

(54) LOCKING FITTING FOR THE INCLINE ADJUSTMENT OF A SEAT BACK

(75) Inventor: Dieter Lange, Petershagen (DE)

(73) Assignee: Faurecia Autositze GmbH & Co. KG (DE)

( * ) Notice: Subject to any disclaimer, the term of this patent is extended or adjusted under 35 U.S.C. 154(b) by 0 days.

(21) Appl. No.: 09/923,739

(22) Filed: Aug. 6, 2001

(65) Prior Publication Data

US 2002/0043855 A1 Apr. 18, 2002

(30) Foreign Application Priority Data

Oct. 16, 2000 (DE) .......................... 100 51 346

(51) Int. Cl.⁷ ............................................ B60N 2/10
(52) U.S. Cl. .................................. 297/367; 297/378.12
(58) Field of Search ............................. 297/367, 378.12

(56) References Cited

U.S. PATENT DOCUMENTS

| | | | | |
|---|---|---|---|---|
| 4,348,050 A | * | 9/1982 | Letournoux et al. | 297/365 |
| 4,789,205 A | * | 12/1988 | Pipon et al. | 297/367 |
| 5,590,931 A | * | 1/1997 | Fourrey et al. | 297/366 |
| 5,722,730 A | * | 3/1998 | McKernan | 297/463.1 |
| 5,769,494 A | * | 6/1998 | Barrere et al. | 297/367 |
| 6,312,053 B1 | * | 11/2001 | Magyar | 297/367 |
| 6,328,382 B1 | * | 12/2001 | Yamashita | 297/367 |

FOREIGN PATENT DOCUMENTS

GB 2117440 A * 10/1983

* cited by examiner

*Primary Examiner*—Peter M. Cuomo
*Assistant Examiner*—Joseph Edell
(74) *Attorney, Agent, or Firm*—Bourque & Associates, P.A.

(57) ABSTRACT

A tilt adjustment mechanism for a seat back such as an automobile seat back includes a mechanism upper part and a mechanism lower part that are mounted in opposition about a common horizontal swivel axis so as to be free to move relative to one another. One mechanism part includes an inner-toothed surface while the other mechanism includes several outer-toothed blocking elements. The outer-toothed surfaces of several blocking elements mounted in the other mechanism part free to be radially displaced and are evenly distributed about a swivel axis. The outer-toothed surfaces of the several blocking elements are held engaged with the inner toothed surface against the force of a spring by means of a control surface of a rotatable cam device. The blocking elements rest entirely on support surfaces of adjacent blocking elements as are slidable relative to one another.

9 Claims, 5 Drawing Sheets

LOCKING FITTING FOR THE INCLINE ADJUSTMENT OF A SEAT BACK

TECHNICAL FIELD

The invention relates to a mechanism for adjusting and maintaining the tilt adjustment of a seat back.

BACKGROUND INFORMATION

For an adjustment mechanism of the conventional type such as disclosed in FR 25 78 602 A1, three outer-toothed blocking elements are provided that, when in a blocked or locked position, engage their outer-toothed surfaces with the inner-toothed surfaces of another mechanism, and rest against three control surfaces of a cam disk.

The blocking elements are mounted using a loose friction bearing of one mechanism part so that they may be displaced radially. The necessary play or looseness results in a tilting of the blocking elements in case of a crash. This leads to a partial disengagement of the external toothed surfaces of the blocking element from the opposing inner-toothed surfaces with the result that the mechanism can slip.

Based on this state of the art, the invention has the task of improving the existing type of adjustment mechanism so that the toothed surfaces of the adjustment mechanism remain securely engaged even during a crash.

SUMMARY OF THE INVENTION

The present invention features a mechanism for adjusting and maintaining seat back tilt by utilizing the mutual opposition of the moveable blocking elements that prevents their tilting. Also, the blocking elements are held more securely in proper position on the control surface from which it may not slip.

In one preferred embodiment, the blocking elements are held in the blocked condition between a guide area of the control surface of a cam device and the contact surface of an adjacent blocking element. This creates additional security against slippage. Other embodiments are disclosed and claimed herein.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Seats with tilt or adjustable backs, such as automobile seats, typically include an adjustment mechanism to adjust the seat back tilt. The seat back is often pre-tensioned along the direction of travel by a spring so that it returns to its upright position about its swivel axis 3, FIG. 1, when an adjustment mechanism is released.

From this upright position, the seat back 1 may be set to the desired position by pressure from the seat user's back. In this position, the seat back 1 may again be locked by the adjustment mechanism. An adjustment mechanism is typically positioned on each side of the seat. Each adjustment mechanism is connected with the opposing adjustment mechanism via a link or rod 6.

Figure 1:
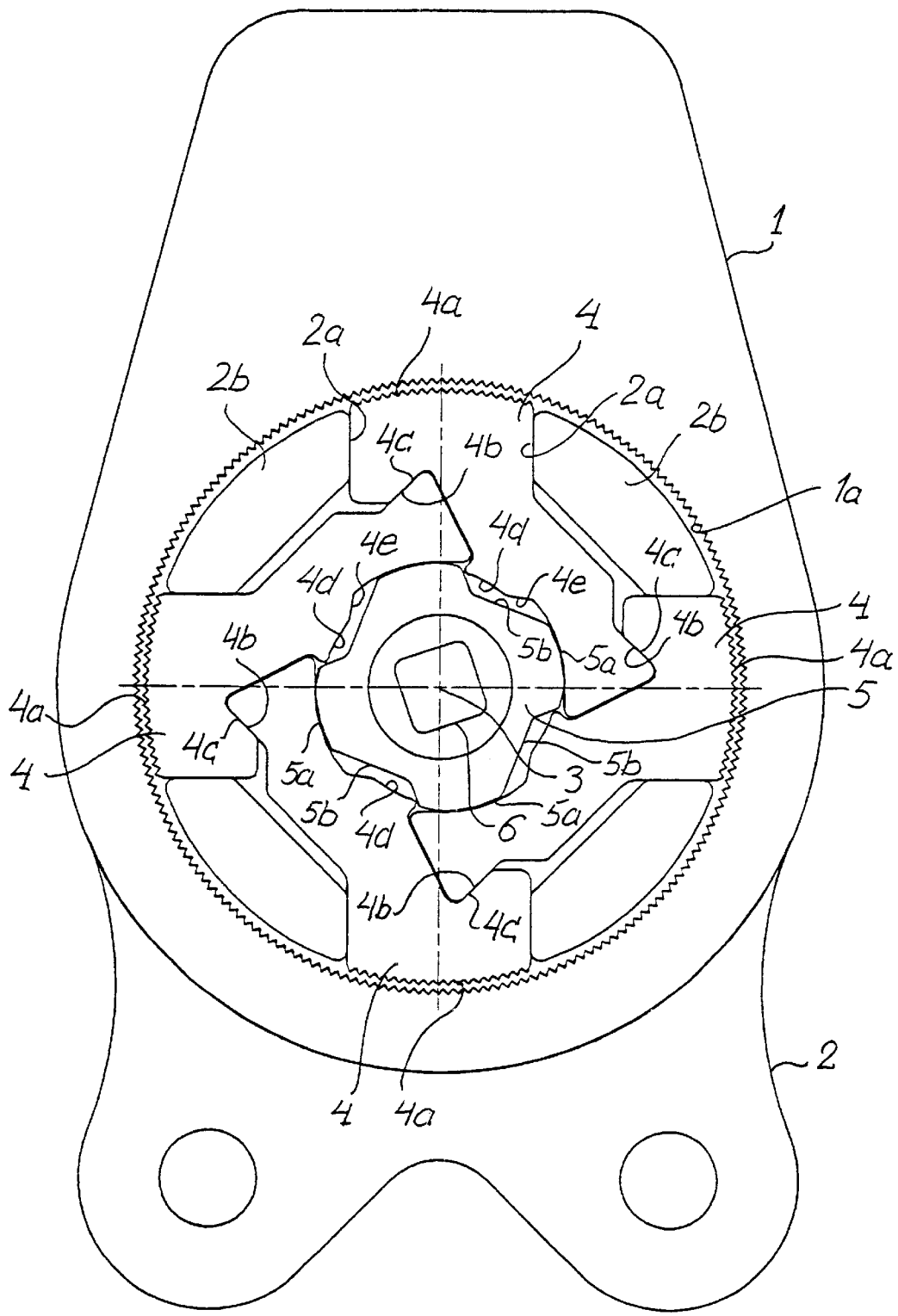
FIG. 1 is a cutaway view of a released adjustment mechanism according to the present invention.
Figure 2:
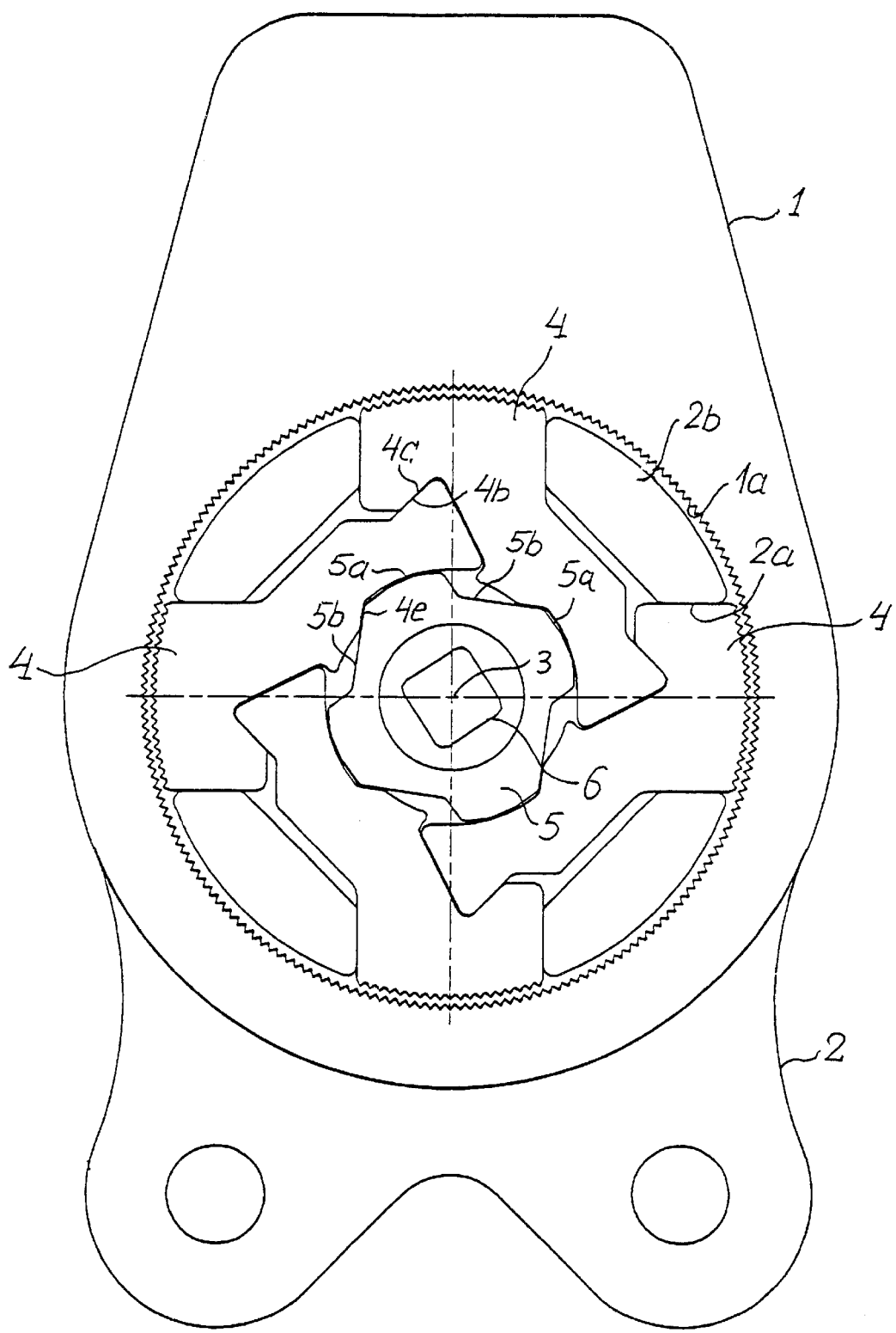
FIG. 2 is a cutaway view of a released adjustment mechanism as in FIG. 1 with its locking cam in a disengaged or end position.

FIG. 1 merely shows the adjustment mechanism at the side of a seat. The adjustment mechanism is firmly fixed via its mechanism upper part 1 to the seat back and via its lower part 2 to the seat body. The adjustment mechanism upper part 1 includes an inner-toothed surface 1a concentric to the swivel axis 3 into which blocking elements 4 may engage with their arc-shaped outer-toothed surface 4a.

The blocking elements 4 are mounted between guide surfaces 2a facing each other so that they may be displaced radially. The guide surfaces 2a are provided on guide segments 2b that are formed as one piece with the mechanism lower part 2. The outer-toothed surfaces 4a of the blocking elements 4 are held away from the inner-toothed surface 1a by springs (not shown in the drawing) but nonetheless well known in the art.

Figure 4:
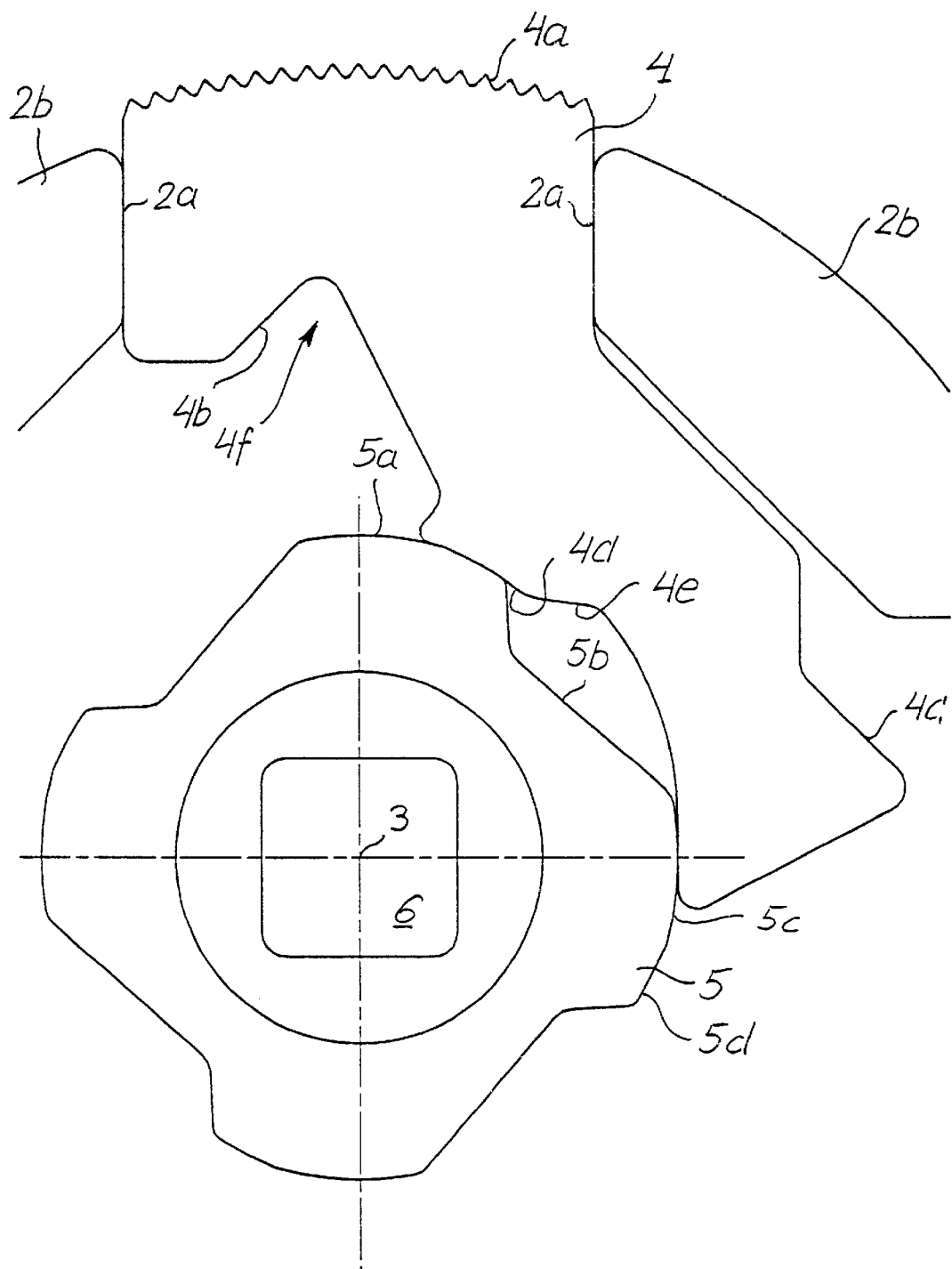
FIG. 4 is a partial enlarged section of the adjustment mechanism as in FIG. 3.
Figure 5:
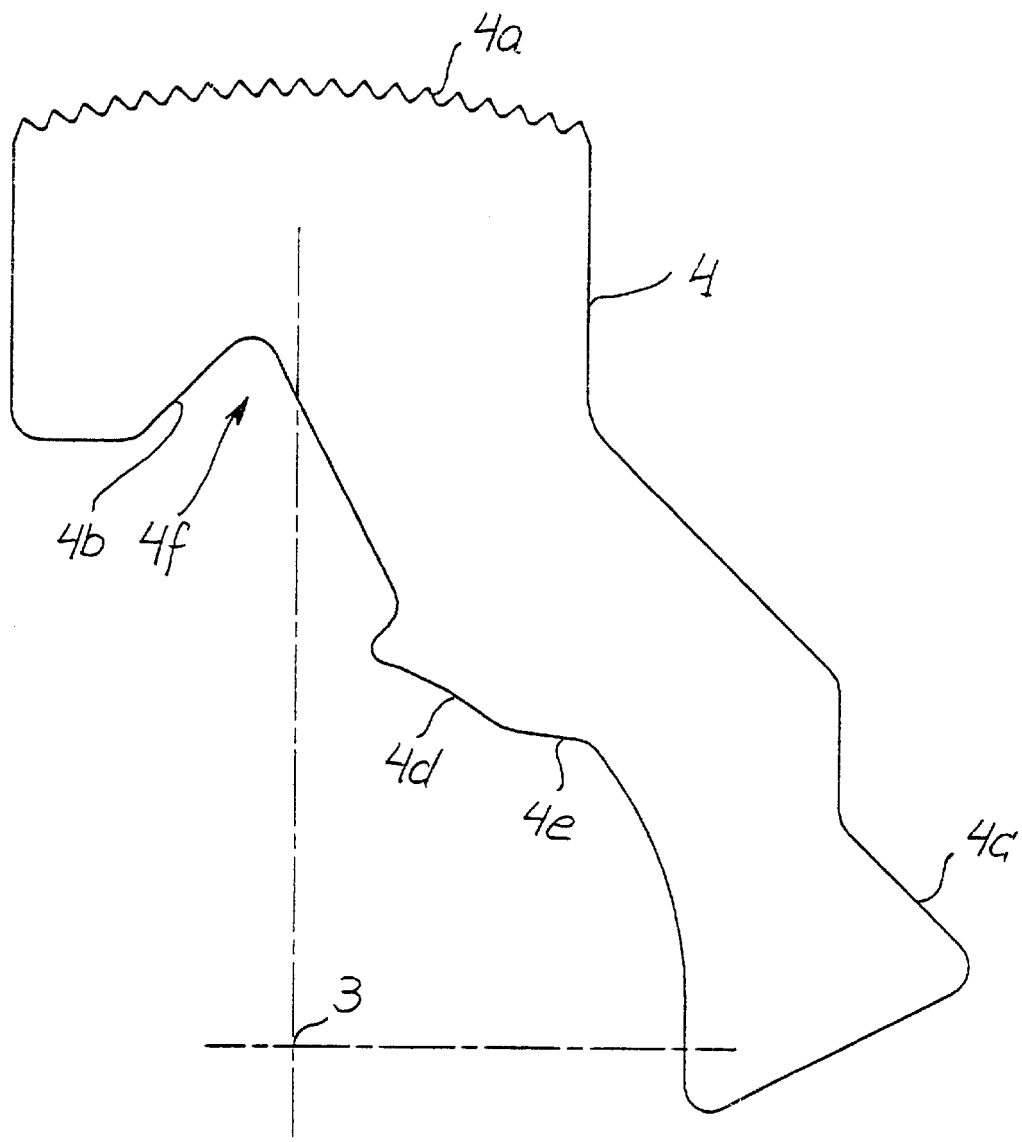
FIG. 5 is a plan view of the blocking element of the adjustment mechanism as in FIG. 1.

The outer-toothed surfaces 4a of the blocking elements 4 are engaged with the inner-toothed surface 1a by a cam disk 5 rotating about the swivel axis 3. The cam disk 5 possesses a number of control surfaces 5a that equals the number of blocking elements 4. The control surfaces 5a are separated from each other by recoil areas 5b. Each control surface 5a, FIG. 4, is divided into a guide area 5c and an eccentric area 5d.

Figure 3:
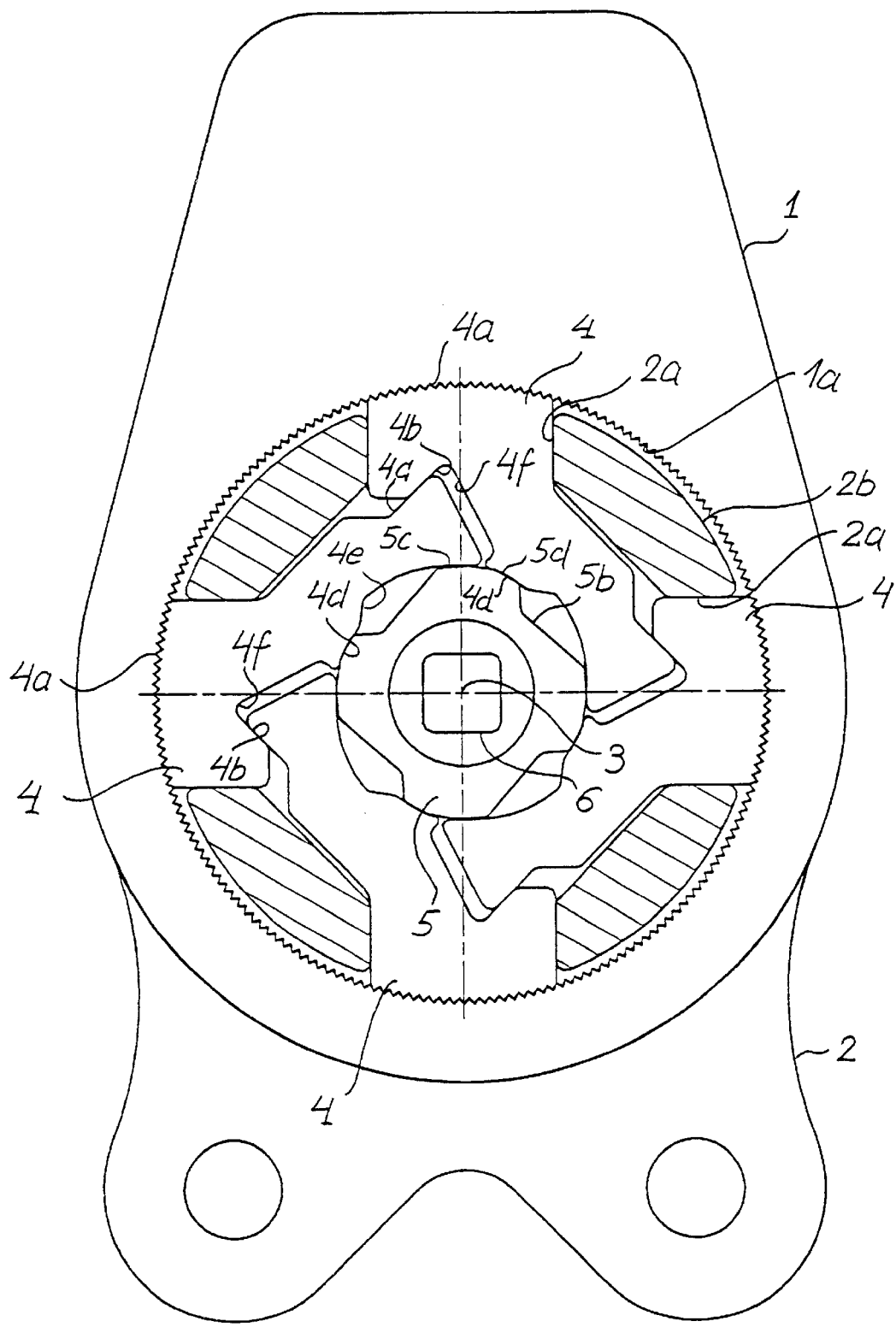
FIG. 3 is a cutaway view of an adjustment mechanism as in FIG. 1 in a locked position.

The adjustment mechanism is provided with four blocking elements 4, FIG. 1, mounted in pairs opposite each other. The blocking elements 4 include opposing surfaces 4d that rest against the control surfaces 5a in the locked condition of an adjustment mechanism as shown in FIG. 3. Located adjacent and as an extension of the opposing surfaces 4d is a striking surface 4e that limits rotation of the cam disk 5 to one rotating direction.

Each blocking element 4 includes an extension prolongation that partially surrounds the cam disk 5. On the end facing away from the outer-toothed region 4a, the blocking element 4 includes a support surface 4c that rests on a support surface 4b of an adjacent blocking element 4 that is formed by a recess 4f. The support surfaces 4b and 4c preferably extend at an angle of 45 to the adjustment direction of the blocking element 4, and are formed as sliding surfaces.

In a locked condition, each end of the blocking elements 4 that includes the support surfaces 4c rests on the guide areas 5c of the subsequent support surface 5a. The blocking element 4 is thus fed both through and along opposing guide surfaces 2a of adjacent guide segments 2b and through guide area 5c and the support surface 4b. The stability of the adjustment mechanism is thus considerably increased. Further, given that the blocking elements 4 rest on support or guide surfaces 2a, the blocking elements 4 can, when in a locked condition, no longer disengage even in the case of forces resulting from a crash.

The adjustment mechanism is released by an actuating lever (not shown) that is firmly fixed to the link or rod 6. The cam disk 5 is rotated counter-clockwise around the swivel axis 3 via the link 6. If the opposing surface 4d is moved to the recoil area 5b, and thus can no longer occupy the eccentric area 5d, the blocking element 4 is retracted from the inner-toothed surface 1a by means of an attached spring (not shown). Since this occurs at the same time for all blocking elements 4, the seat back may be tilted about the swivel axis 3 to the desired position.

By rotating the cam disk 5 clockwise, the seat back is again locked into the new position. In this case, the eccentric areas 5d are positioned under the opposing surfaces 4d so that the blocking element 4 is forced outward. All blocking elements 4 are displaced simultaneously because they are coupled together both via the cam disk 5 and the support surfaces 4b and 4c. The control surface 5a following in the rotational direction of the cam disk 5 rests with its guide area 5c on the untoothed end of the blocking element 4 and presses support surfaces 4b and 4c against each other. This causes the adjustment mechanism again to be locked.

Modifications and substitutions by one of ordinary skill in the art are considered to be within the scope of the present invention, which is not to be limited except by the following claims.

The invention claimed is:

1. A tilt adjustment mechanism for a seat back, said mechanism comprising:

a mechanism upper part and a mechanism lower part, said upper and lower parts mounted so as to be free to swivel with respect to each other about a common horizontal swivel axis;

one of said upper and lower parts of said mechanism including an inner-toothed surface and the other one of said upper and lower parts of said mechanism including at least three blocking elements each having an outer-toothed surface, said at least three blocking elements generally evenly distributed around said horizontal swivel axis and radially displaceable such that said outer-toothed surfaces of each of said at least three blocking elements may engage with a portion of said inner-toothed surface, wherein each of said at least three blocking elements includes a first blocking element region adapted to rest against, and slide relative to, a support surface of an adjacent blocking element, and wherein each of said at least three blocking elements further includes a second blocking element region that engages a first and a second cam control surface of a rotatable cam device when said tilt adjustment mechanism is disposed in a blocking position such that said outer-toothed surfaces of each of said at least three blocking elements are held engaged with said inner-toothed surface.

2. The tilt adjustment mechanism as in claim 1, wherein each of said control surfaces are at an angle relative to each other.

3. The tilt adjustment mechanism as in claim 2, wherein said control surfaces of said cam device are separated from each other by a recoil area, and wherein portions of two second blocking element regions of adjacent blocking elements each engage a single control surface of said cam device when said tilt mechanism is disposed in said blocking position.

4. The tilt adjustment mechanism as in claim 2, wherein each of said control surfaces of said cam device includes a guide area with a substantially constant radius about said common horizontal swivel axis proximate a first angled section of said cam device, and an eccentric area eccentric to said common horizontal swivel axis proximate a second, adjacent angled section of said cam device.

5. The tilt adjustment mechanism as in claim 1, wherein each of said at least three blocking elements includes a striking surface that limits the rotation of said cam device in a loosening direction.

6. The tilt adjustment mechanism as in claim 1, wherein each of said at least three blocking elements is held in place proximate an inner end facing away from said outer-toothed area between an adjacent blocking element and the cam device.

7. The tilt adjustment mechanism as in claim 6, wherein the end of the blocking element held between the cam device and the adjacent blocking element is conically tapered in a direction of the outer-toothed surface.

8. The tilt adjustment mechanism as in claim 1, wherein said at least three blocking elements include four blocking elements which are generally evenly distributed about said common horizontal swivel axis and free to be radially displaced.

9. The tilt adjustment mechanism as in claim 1, wherein the Support surface and the first blocking element region are shaped to be inclined toward an adjustment direction of the blocking elements.

* * * * *